United States Patent
Ghahramani

(10) Patent No.: US 11,468,297 B2
(45) Date of Patent: Oct. 11, 2022

(54) UNIT-LEVEL UNCERTAINTY AND PROPAGATION

(71) Applicant: Uber Technologies, Inc., San Francisco, CA (US)

(72) Inventor: Zoubin Ghahramani, Cambridge (GB)

(73) Assignee: Uber Technologies, Inc., San Francisco, CA (US)

(*) Notice: Subject to any disclaimer, the term of this patent is extended or adjusted under 35 U.S.C. 154(b) by 952 days.

(21) Appl. No.: 16/172,510

(22) Filed: Oct. 26, 2018

(65) Prior Publication Data

US 2019/0130256 A1 May 2, 2019

Related U.S. Application Data

(60) Provisional application No. 62/577,631, filed on Oct. 26, 2017.

(51) Int. Cl.
*G06N 3/04* (2006.01)
*G06N 3/08* (2006.01)

(52) U.S. Cl.
CPC ......... *G06N 3/0472* (2013.01); *G06N 3/0481* (2013.01); *G06N 3/084* (2013.01)

(58) Field of Classification Search
CPC .... G06N 20/10; G06N 3/0472; G06N 3/0481; G06N 3/084; G06N 5/003; G06N 7/005
See application file for complete search history.

(56) References Cited

U.S. PATENT DOCUMENTS

| | | | |
|---|---|---|---|
| 2002/0184569 A1 | 12/2002 | O'Neill | |
| 2003/0191728 A1 | 10/2003 | Kulkarni et al. | |
| 2004/0133533 A1* | 7/2004 | Keeler | G06N 3/049 706/21 |
| 2011/0066579 A1 | 3/2011 | Ikada | |
| 2016/0012330 A1 | 1/2016 | Pescianschi | |
| 2017/0330109 A1* | 11/2017 | Maughan | G06N 5/04 |
| 2019/0122073 A1* | 4/2019 | Ozdemir | A61B 6/5217 |

OTHER PUBLICATIONS

Abdelaziz et al., "Uncertainty Propagation through Deep Neural Networks", Sep. 2015, Interspeech 2015, pp. 1-6. (Year: 2015).*
PCT International Search report and Written Opinion, PCT Application No. PCT/IB2018/058411, dated Feb. 20, 2019, 11 pages.

* cited by examiner

*Primary Examiner* — Brent Johnston Hoover
(74) *Attorney, Agent, or Firm* — Fenwick & West LLP

(57) ABSTRACT

Neural Networks such as Deep Neural Networks (DNNs) output calibrated probabilities that substantially represent frequencies of occurrences of events. A DNN propagates uncertainty information of a unit of the DNN from an input to an output of the DNN. The uncertain information measures a degree of consistency of the test data with training data used to train a DNN. The uncertainty information of all units of the DNN can be propagated. Based on the uncertainty information, the DNN outputs probability scores that reflect received input data that is substantially different from the training data.

20 Claims, 4 Drawing Sheets

UNIT-LEVEL UNCERTAINTY AND PROPAGATION

CROSS REFERENCE TO RELATED APPLICATIONS

This application claims the benefit of U.S. Provisional Application No. 62/577,631, filed Oct. 26, 2017 which is hereby incorporated in its entirety by reference.

BACKGROUND

1. Technical Field

The subject matter described relates generally to neural networks, and more specifically to measuring uncertainty in deep neural networks.

2. Background Information

Deep Neural Networks (DNNs) are widely used in industry and are a major cornerstone of modern Artificial Intelligence (AI) applications such as speech recognition and generation, computer vision and image recognition, self-driving cars, robotics, machine translation, question-answering and dialog systems, medical image processing, and many others. Conventional DNNs' output are associated with probabilities that are typically not well-calibrated and thus their values do not represent actual frequencies of occurrences of the events. These probabilities cannot be trusted by mission-critical applications. In addition, these DNNs are susceptible to adversarial examples that trigger the DNNs to produce incorrect output associated with high probabilities. Moreover, these conventional DNNs perform poorly in situations where input data distributions significantly deviate from training data. The DNN's outputs are unreliable and do not reveal real uncertainties or certainties.

SUMMARY

Neural network models such as deep learning models measure uncertainty as a result of input data deviating from the training data. Compared to conventional models that do not evaluate uncertainty information, neural network models described herein output predictions that are substantially better calibrated. That is, neural networks described herein output indications of low confidence predictions caused by input data substantially different from training data used to develop the neural networks. The uncertainty information propagates throughout layers of the neural network. In some embodiments, the uncertainty information propagates from one unit to another unit.

During training, the unit records input uncertainty information such as a distribution of input data. The given unit may determine a safe region corresponding to predictions that the unit is certain. In one embodiment, the safe region is p=0.001 and 1−p=0.999 quantiles of the input data. The unit may update the input uncertainty information during testing and/or when in use. If an input is outside the safe region, the given unit is uncertain about the prediction and associates the prediction with uncertainty information. In some embodiments, the uncertainty information associated with the prediction includes an upper bound and a lower bound together that define an error range for its prediction. The unit may determine a degree of uncertainty as a difference between the upper bound and the lower bound. The unit may apply an error function to determine the uncertainty information associated with the prediction. The unit provides the prediction and associated uncertainty information if any to the next unit. The uncertainty information associated with a unit's output propagates through the network.

Systems based on neural network models described herein are advantageous for at least the following reasons. Systems can detect and are more robust to outliers, anomalies, and adversarial data. This is because the system measures and evaluates input uncertainty at a unit-level. In addition, uncertainty information can be introduced to existing neural network models without retraining. An additional advantage is that the process is computationally efficient and can be easily implemented in existing computational frameworks.

DETAILED DESCRIPTION

Figure 1:
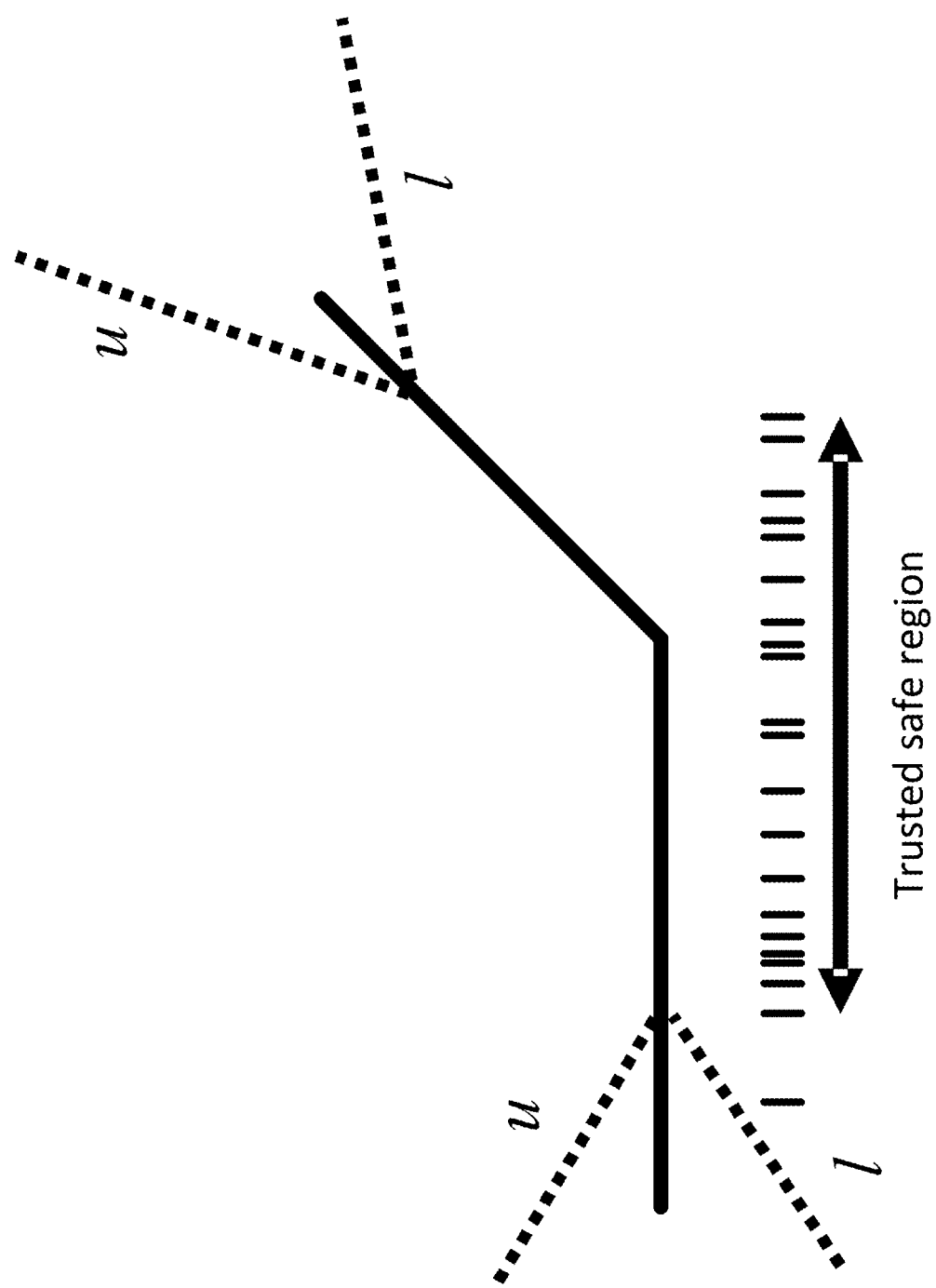
FIG. 1 is an output curve of an example individual unit of a neural network that measures input uncertainty, according to one embodiment.

Bayesian neural networks can output calibrated measures of uncertainty by capturing uncertainty in models. Bayesian network conditions on training data D, a prior distribution that is put on the parameters p(w) to obtain a posterior distribution on the parameters p(w|D). Bayesian networks represent uncertainties in weights w; however, the posterior converges to a delta function around the maximum likelihood value in large data limit (N→∞). In other words, Bayesian neural networks over-confidently extrapolate test data outside the training data D. These unreasonable extrapolations propagate through the entire network because each component of a Bayesian network is parametric.

The Figures and the following description describe certain embodiments by way of illustration only. One skilled in the art will readily recognize from the following description that alternative embodiments of the structures and methods may be employed without departing from the principles described. Wherever practicable, similar or like reference numbers are used in the figures to indicate similar or like functionality.

Unit-Level Uncertainty

In a neural network, each unit (e.g., neuron) records input uncertainty information such as a distribution of input data it has received, for example, during training. As one example, a node stores an empirical distribution of input data $\{a^{(n)}\}$ that it has received. The minimum value ($a_{min}=\min\{a^{(n)}:n=1 \ldots N\}$) and the maximum value ($a_{max}=\max\{a^{(n)}: n=1 \ldots N\}$) are identified and a distribution of data points in the range defined by the minimum value and the maximum value is determined. The minimum value and the maximum value are also referred herein as a lower bound and an upper bound. The unit determines an input data range corresponding to predictions that the unit is certain. This input data range is also referred to herein as a safe region. The input data range may be represented as one or more quantiles. For example, the input data range for a unit is defined by p=0.001 and 1−p=0.999 quantiles and captures the one-in-a-thousand extrapolation region of the input data. The value p is a threshold for the unit to determine that the input data is outside the safe region. If the input data is outside the safe region, the unit determines uncertainty information associated with the prediction.

During testing or operation, if an input $a_m$ is inside the safe region, the unit determines a prediction $f(a_m)$ by applying the activation function to the input. The symbol f denotes the activation function that defines the node's prediction for an input. If the input is outside the safe region, the unit determines a prediction by applying the activation function. In addition, the node determines an error range of the prediction. The node can determine an upper bound and a lower found based on an amount of deviation from the safe region. In some embodiments, for a unit, its output can be determined according to Equations (1)-(2):

$$u = \begin{cases} f(a) + s(a_\ell - a) & \text{if } a < a_\ell \\ f(a) & \text{if } a_\ell \leq a \leq a_u \\ f(a) + s(a - a_u) & \text{if } a > a_u \end{cases} \quad (1)$$

$$\ell = \begin{cases} f(a) - s(a_\ell - a) & \text{if } a < a_\ell \\ f(a) & \text{if } a_\ell \leq a \leq a_u \\ f(a) - s(a - a_u) & \text{if } a > a_u \end{cases} \quad (2)$$

where u is the upper bound of the unit's prediction, l is the lower bound of the unit's prediction, s is a constant that determines a slope of a linear function, a is the unit's input, $a_u$ is the upper bound of the unit's safe region, and $a_l$ is the upper bound of the safe input region. In the illustrated example, for each unit, a pair of values (i.e., the upper bound $a_u$ and the lower bound $a_l$) is represented. This is because the activation functions f typically monotonically increases at each level. FIG. 1 illustrates an example unit's output. The error bars represent the uncertainty in the unit's prediction. A distance between the upper bound and lower bound of the error bars (i.e., (u-l)) represents a degree of uncertainty associated with a prediction. In the illustrated example, the error function is a linear function. Nonlinear functions can also be used.

The value s can be determined in a number of ways. For example, a constant value is used for all units of a neural network model. A constant value is used for units of a particular layer. Alternatively, different values are used for different units. The value of the slope s can be determined by using a validation data set. The validation data set may include intentionally perturbed data (e.g., adversarial examples, artificially generated outliers, or noise, etc.) As such, a value of the slope s can be set such that a high (or a low) uncertainty is associated with predictions based on perturbed (or real) data.

The equations (1)-(2) also apply to uncertainty represented by quantiles rather than upper and lower bounds as described herein. For example, $a_l$ and $a_u$ can be set as quantiles. For example for p=0.001, consider all training data used, a value for that unit for which 0.1% of the training data would have activation below $a_l$ and 0.1% has activation above $a_u$ is calculated. This can be done by sorting all the training data by the activation value or sorts a random sample of the data (e.g., 1000 data points). The activation value is an output of an activation function given a particular input. Effectively, this can be done by storing min and max statistics during a minibatch of data during training. Storing quantiles provides useful information. For example, for any given test data point, the fraction of units that fall outside in the tails of the quantiles can be counted to determine if a test data point is anomalous, an outlier, or otherwise strange. In other words, if much more than 0.1% of units in a network is outside the 0.001 quantile, the data point is likely to be anomalous.

In various embodiments, the uncertainty information is updated regularly during training. During training, a unit updates the uncertainty information if the newly received training data includes a different distribution. The uncertainty information may be further updated during testing, for example, the quantiles can be updated concurrently while processing minibatches. A range of data is recorded over multiple consecutive minibatches and quantiles are determined from the range of data. For example, the minimum values over 4 batches of 256 data points are recorded, which gives an approximate p=0.001 quantile. The quantiles determined from the newly recorded minibatches are combined with quantiles determined from previously recorded minibatches, for example, via a running average.

Uncertainty Propagation

In a deep network, unit-level uncertainty as described above propagates through the network as further explained below. In some embodiments, all units propagate unit-level uncertainty through the network such that the network's output includes network-level uncertainty measures.

Consider a two-layer (j→i) forward propagation represented according to Equation (3):

$$y_i = f_i(a_i) = f_i\left(\sum_j w_{ij} y_j\right) = f_i\left(\sum_j w_{ij} f_j(a_j)\right), \quad (3)$$

where $y_i$ and $y_j$ denote the output of a units i,j, respectively; $a_i$ and $a_j$ denote the input to the units i,j, respectively; $f_i$ denotes the activation function at unit i, $w_{ij}$ denotes one or more weights from unit i to unit j in the next layer. Indexing by data points, n, are omitted in Equation (3) for clarity. By way of using the network represented in Equation (3) as an example, as further explained below, unit-level uncertainty propagates through deep networks.

Because the activation function $f_x$ monotonically increases, a range of a layer's output can be determined by first calculating the inner summation $\Sigma_j w_{ij} [\ell_j, u_j]$ which is then provided as an input to the activation function $f_x$. $[\ell_j, u_j]$ denotes lower and upper bounds calculated for unit j according to Equations (1)-(2). Accordingly, a range of the unit j's output weighted by weights to unit i can be determined according to Equations (4)-(5):

$$\tilde{\ell}_{ij} = \begin{cases} w_{ij} \ell_j & \text{if } w_{ij} \geq 0 \\ w_{ij} u_j & \text{if } w_{ij} < 0 \end{cases}, \quad (4)$$

$$\tilde{u}_{ij} = \begin{cases} w_{ij} u_j & \text{if } w_{ij} \geq 0 \\ w_{ij} \ell_j & \text{if } w_{ij} < 0 \end{cases}. \quad (5)$$

In some embodiments, during testing, a neural net computation graph is converted into the corresponding computation graph that propagates the upper and lower bounds. As one example, the equations (4)-(5) are converted. Subsequent to the conversion, a per test point runtime increased by a factor (e.g., 2) is incurred.

For each unit i, four values can be calculated according to Equations (6)-(9):

$$u_i^u = \begin{cases} f_i(\hat{u}_i) + s(a_{i,\ell} - \hat{u}_i) & \text{if } \hat{u}_i < a_{i,\ell} \\ f_i(\hat{u}_i) & \text{if } a_{i,\ell} \leq \hat{u}_i \leq a_{i,u} \\ f_i(\hat{u}_i) + s(\hat{u}_i - a_{i,u}) & \text{if } \hat{u}_i > a_{i,u} \end{cases} \quad (6)$$

$$\ell_i^u = \begin{cases} f_i(\hat{u}_i) - s(a_{i,\ell} - \hat{u}_i) & \text{if } \hat{u}_i < a_{i,\ell} \\ f_i(\hat{u}_i) & \text{if } a_{i,\ell} \leq \hat{u}_i \leq a_{i,u} \\ f_i(\hat{u}_i) - s(\hat{u}_i - a_{i,u}) & \text{if } \hat{u}_i > a_{i,u} \end{cases} \quad (7)$$

$$u_i^\ell = \begin{cases} f_i(\hat{\ell}_i) + s(a_{i,\ell} - \hat{\ell}_i) & \text{if } \hat{\ell}_i < a_{i,\ell} \\ f_i(\hat{\ell}_i) & \text{if } a_{i,\ell} \leq \hat{\ell}_i \leq a_{i,u} \\ f_i(\hat{\ell}_i) + s(\hat{\ell}_i - a_{i,u}) & \text{if } \hat{\ell}_i > a_{i,u} \end{cases} \quad (8)$$

$$u_i^\ell = \begin{cases} f_i(\hat{\ell}_i) - s(a_{i,\ell} - \hat{\ell}_i) & \text{if } \hat{\ell}_i < a_{i,\ell} \\ f_i(\hat{\ell}_i) & \text{if } a_{i,\ell} \leq \hat{\ell}_i \leq a_{i,u} \\ f_i(\hat{\ell}_i) - s(\hat{\ell}_i - a_{i,u}) & \text{if } \hat{\ell}_i > a_{i,u} \end{cases} \quad (9)$$

where $\hat{\ell}_i$ denotes the inner summation $\Sigma_j \ell_{ij}$, and $\hat{u}_i$ denotes the inner summation $\Sigma_j \hat{u}_{ij}$.

For the unit i, a range of the output provided by the activation functions can be determined according to Equations (10)-(11):

$$u_i = \max\{u_i^u, \ell_i^u, u_i^\ell, \ell_i^\ell\} \quad (10),$$

$$\ell_i = \min\{u_i^u, \ell_i^u, u_i^\ell, \ell_i^\ell\} \quad (11).$$

As illustrated, uncertainty bounds recorded at individual units propagate between different levels and thereby can propagate through a network. A network's output includes uncertainty information that includes upper bounds and lower bounds indicating levels of uncertainty due to test data outside the training data's range.

Uncertainty Aware Training

In further embodiments, uncertainty is propagated during training. For every data point, instead of using forward propagation, forward bound propagation is used. At units' outputs, upper bounds u and lower bounds l are recorded and transformed into a log likelihood representing loss. For regression, predictions such as a Gaussian with a mean of $(u+\ell)/2$ and a standard deviation of $\sigma+(u-\ell)/2$ are used. For classification, the prediction class probabilities can be the highest entropy (most uncertainty) distribution consistent with the bounds of the final logistic function (or the softmax function) that outputs classifications. Subsequently, the gradient of this loss/likelihood is back-propagated through the forward bound propagation computation graph. In some cases, a slope of error bars s and quantiles p can be differentiated, or at least modified using Bayesian optimization or some gradient free hill climbing.

The process described outputs calibrated uncertainty for optimal decision making. Applications that make decisions on neural networks' output benefit from calibrated uncertainty. Example applications include self-driving, fraud detection or other data science applications, maps, robotics, computer vision (e.g., object recognition), financial prediction (e.g., stocking trading, risk evaluation, etc.), medical diagnosis, and speech recognition (e.g., dialogue or natural language processing). In addition, the process detects anomalous input and notifies users of the anomalous output, for example, by associating probabilities with output. Furthermore, the process detects units that are not operating in the normal operating range.

Full Gaussian Process Networks

In further embodiments, each unit includes a linear combination followed by a one-dimensional Gaussian process. An entire network or a portion thereof is a version of a deep GP (ref) and is related to Gaussian Process Regression Networks (GPRNs; ref). During training, linear weights and/or GP functions are learned. Naive learning in a GP is an $O(N^3)$ computation per iteration, but one dimensional GPs can be trained exactly for many sensible kernels using $O(N)$ methods (e.g., Gauss-Markov methods) and approximately in sublinear time.

Figure 2B:
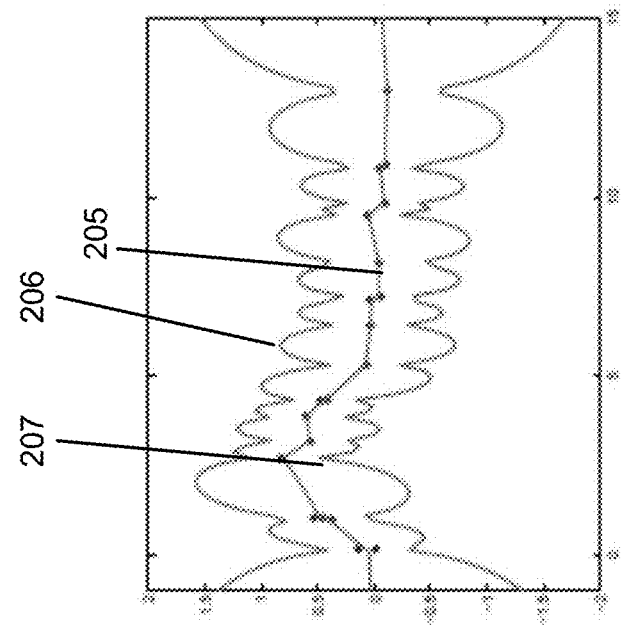
FIGS. 2A-2B illustrate uncertainty observed using Gaussian processes based on different kernels.
Figure 2A:
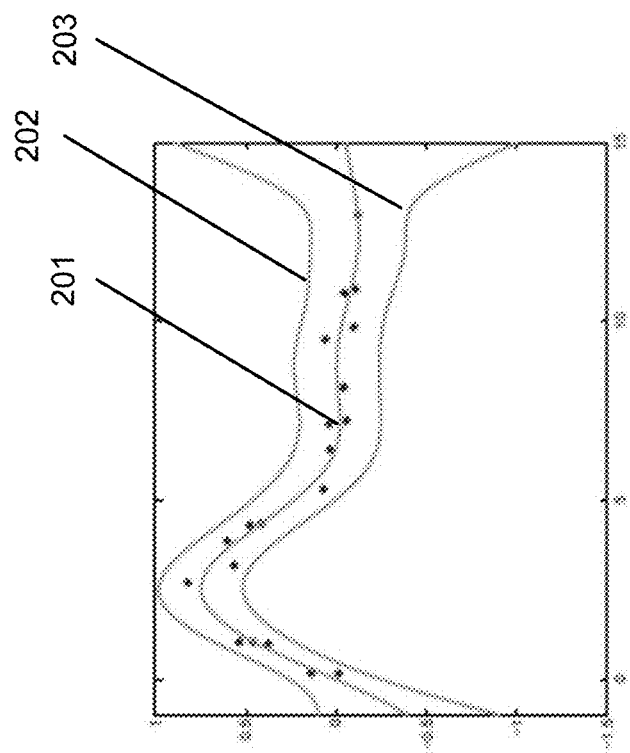

FIGS. 2A-2B illustrate example Gaussian process functions with error bars (±2 standard deviations). The process illustrated in FIG. 2A uses a squared exponential kernel whereas the process illustrated in FIG. 2B uses a Brownian kernel. In both figures, training data is represented by dots. The curves 201 and 205 represent trend of the training data. As illustrated, Gaussian processes capture uncertainty. The error bars 202-203 and 206-207 increase as test data deviates from the training data. In particular, the curves 202 and 206 represent an upper bound in each case and the curves 203 and 207 represent a lower bound in each case.

Figure 3:
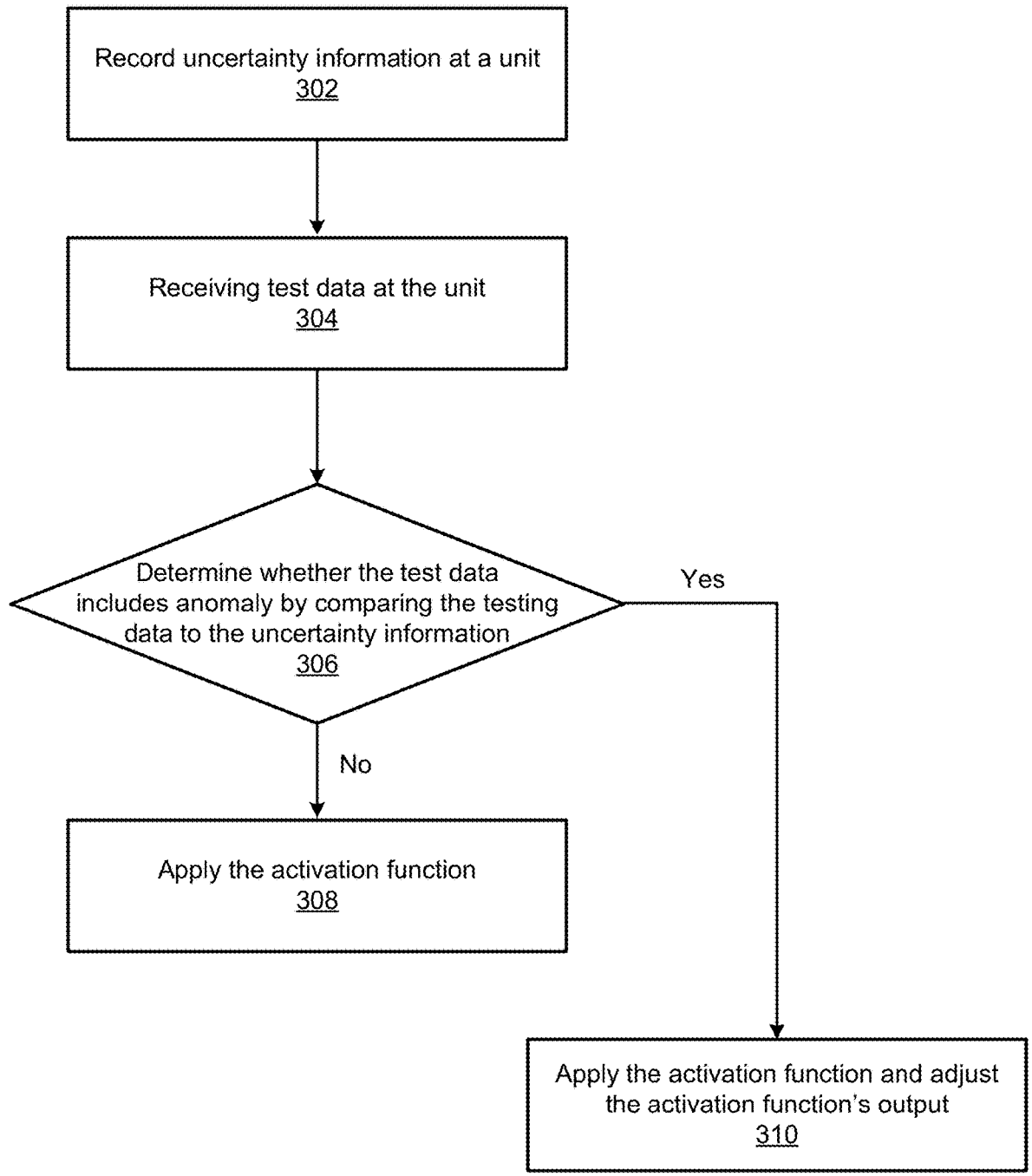
FIG. 3 is a flow chart illustrating operation of a unit of an example neural network that measures and propagates input uncertainty, according to one embodiment.

FIG. 3 is a flow chart illustrating operation of a unit that measures and propagates uncertainty information, according to one embodiment. The unit is a neuron of a neural network that is configured to perform a task such as object recognition, fraud detection, wheel steering, etc. The unit records 302 uncertainty information during training. For example, the unit records a distribution of training data received at the unit and determines a safe region that the unit is certain to make a prediction. In some embodiments, the uncertainty information is represented by a maximum value and a minimum value of the training data. In some embodiments, the uncertainty information is represented by one or more quantiles.

During operation, the unit receives 304 input data. The unit determines 306 a prediction based on the input data. That is, the unit applies an activation function to the input data to determine the prediction. The input data can be test data for testing purposes or real data in operation.

The unit determines 308 whether the input data deviates from the training data based on the uncertainty information. The unit compares the input data to the uncertainty information recorded at the unit to determine whether the test data is inside or outside the safe region. If the test data is outside the safe region, the unit determines that the test data deviates from the training data.

If the test data deviates from the training data, the unit determines 310 a degree of uncertainty that measures a level of confidence in the unit's prediction. In some embodiments, the degree of uncertainty is represented by a distance of an error range of the unit's prediction. The unit applies an error function to the difference between the test data and an upper bound (or a lower bound) of the safe region to calculate an upper bound and a lower bound of an error range of the unit's prediction. The unit provides 312 the prediction and the degree of uncertainty to a next unit. If the test data does not deviate from the training data, the unit provides 314 the prediction to a next unit.

The unit's output uncertainty propagates throughout the neural network. For example, a unit (or a layer) receives predictions associated with degrees of uncertainty from a previous layer. Based on predictions and degrees of uncertainty received from the previous unit (or previous layer), the unit (or the layer) determines a level of uncertainty associated with its prediction.

Figure 4:
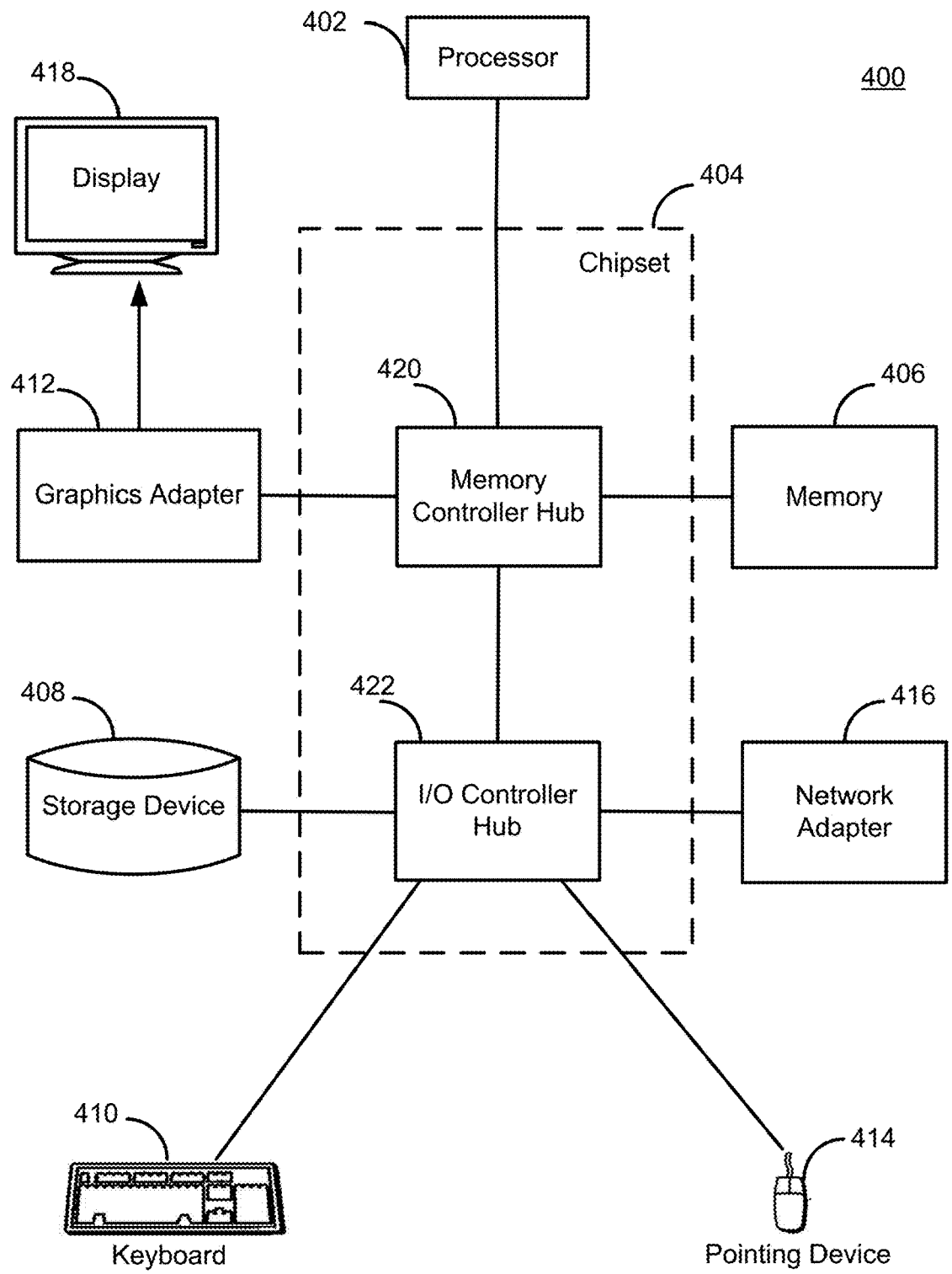
FIG. 4 is a block diagram illustrating a computing device suitable for implementing neural networks that measure and propagate input uncertainty.

FIG. 4 is a block diagram illustrating an example computer 400 suitable for use to implement a deep neural network. The example computer 400 includes at least one processor 402 coupled to a chipset 404. The chipset 404 includes a memory controller hub 420 and an input/output (I/O) controller hub 422. A memory 406 and a graphics adapter 412 are coupled to the memory controller hub 420, and a display 418 is coupled to the graphics adapter 412. A storage device 408, keyboard 410, pointing device 414, and network adapter 416 are coupled to the I/O controller hub 422. Other embodiments of the computer 400 have different architectures.

In the embodiment shown in FIG. 4, the storage device 408 is a non-transitory computer-readable storage medium such as a hard drive, compact disk read-only memory (CD-ROM), DVD, or a solid-state memory device. The memory 406 holds instructions and data used by the processor 402. The pointing device 414 is a mouse, track ball, touch-screen, or other type of pointing device, and is used in combination with the keyboard 410 to input data into the computer system 400. The graphics adapter 412 displays images and other information on the display 418. The network adapter 416 couples the computer system 400 to one or more computer networks. The types of computers used to implement neural networks that record and propagate unit-level uncertainty can vary depending upon the embodiment and the processing power required.

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a passenger transportation system with pre-selection functionality. Thus, while particular embodiments and applications have been illustrated and described, the described subject matter is not limited to the precise construction and components disclosed.

What is claimed is:

1. A computer-implemented method of implementing a neural network including multiple nodes, comprising:
    receiving, at a first node in a first layer, an input data set, the first node storing input uncertainty information representing base data used to train the first node to make predictions;
    generating, by the first node, a first prediction based on the input data set by applying an activation function to the input data set, the first prediction being an output of the activation function;
    determining, by the first node, whether the input data set deviates from the base data by comparing the input data set to the input uncertainty information;
    responsive to determining that the input data set deviates from the base data, determining, by the first node, a first degree of uncertainty associated with the first prediction based on a difference between an upper bound of the first prediction and a lower bound of the first prediction;
    providing, by the first node, the first prediction and the first degree of uncertainty to a second node connected to the first node, the second node in a second layer coupled to the first layer;
    receiving, at the second node, the first prediction and the first degree of uncertainty determined by the first node; and
    determining, by the second node, a second prediction and a second degree of uncertainty based at least on the first prediction and the first degree of uncertainty.

2. The computer-implemented method of claim 1, wherein the input uncertainty information includes a distribution of base data.

3. The computer-implemented method of claim 2, wherein the distribution of base data includes a maximum value and a minimum value of the base data.

4. The computer-implemented method of claim 2, wherein the distribution of base data includes one or more quantiles of the base data.

5. The computer-implemented method of claim 1, wherein the input uncertainty information includes a first threshold and a second threshold defining a safe region of values that the first node is confident to make predictions.

6. The computer-implemented method of claim 5, wherein determining, by the first node, whether the input data set deviates from the base data comprises determining whether the input data set is inside the safe region by comparing the input data set to the first threshold and the second threshold.

7. The computer-implemented method of claim 1, wherein determining the degree of uncertainty comprises:
- determining an amount of deviation between the input data set and the base data; and
- calculating the degree of uncertainty by applying an error function to the amount of deviation.

8. The computer-implemented method of claim 7, wherein the error function is configured to output an upper limit for the first prediction and a lower limit for the first prediction, and wherein the amount of uncertainty associated with the first prediction is a difference between the upper limit and the lower limit.

9. The computer-implemented method of claim 1, wherein the first node in the first layer is one of a plurality of first nodes in the first layer and the second node in the second layer is one of a plurality of second nodes in the second layer, the computer-implemented method further comprising:
- receiving, by the plurality of second nodes in the second layer, a first plurality of predictions associated with a first plurality of degrees of uncertainty, the first plurality of predictions including the first prediction;
- determining, at the second layer, a second plurality of predictions associated with a second plurality of degrees of uncertainty based at least on the first plurality of degrees of uncertainty and the first plurality of predictions.

10. The computer-implemented method of claim 1, further comprising:
- recording, at the first node, the input uncertainty information.

11. A system comprising:
- a processor; and
- non-transitory memory storing instructions configured to cause the processor to perform:
  - receiving, at a first node in a first layer, an input data set, the first node storing input uncertainty information representing base data used to train the first node to make predictions;
  - generating, by the first node, a first prediction based on the input data set by applying an activation function to the input data set, the first prediction being an output of the activation function;
  - determining, by the first node, whether the input data set deviates from the base data by comparing the input data set to the input uncertainty information;
  - responsive to determining that the input data set deviates from the base data, determining, by the first node, a first degree of uncertainty associated with the first prediction based on a difference between an upper bound of the first prediction and a lower bound of the first prediction;
  - providing, by the first node, the first prediction and the first degree of uncertainty to a second node connected to the first node, the second node in a second layer coupled to the first layer;
  - receiving, at the second node, the first prediction and the first degree of uncertainty determined by the first node; and
  - determining, by the second node, a second prediction and a second degree of uncertainty based at least on the first prediction and the first degree of uncertainty.

12. The system of claim 11, wherein the input uncertainty information includes a distribution of base data.

13. The system of claim 12, wherein the distribution of base data includes a maximum value and a minimum value of the base data.

14. The system of claim 2, wherein the distribution of base data includes one or more quantiles of the base data.

15. The system of claim 11, wherein the input uncertainty information includes a first threshold and a second threshold defining a safe region of values that the first node is confident to make predictions.

16. The system of claim 15, wherein the instructions configured to cause the processor to perform determining, by the first node, whether the input data set deviates from the base data comprise instructions configured to cause the processor to perform determining whether the input data set is inside the safe region by comparing the input data set to the first threshold and the second threshold.

17. The system of claim 11, wherein the instructions configured to cause the processor to perform determining the degree of uncertainty comprise instructions configured to cause the processor to perform:
- determining an amount of deviation between the input data set and the base data; and
- calculating the degree of uncertainty by applying an error function to the amount of deviation.

18. The system of claim 17, wherein the error function is configured to output an upper limit for the first prediction and a lower limit for the first prediction, and wherein the amount of uncertainty associated with the first prediction is a difference between the upper limit and the lower limit.

19. The system of claim 11, wherein the first node in the first layer is one of a plurality of first nodes in the first layer and the second node in the second layer is one of a plurality of second nodes in the second layer, and wherein the instructions are further configured to cause the processor to further perform:
- receiving, by the plurality of second nodes in the second layer, a first plurality of predictions associated with a first plurality of degrees of uncertainty, the first plurality of predictions including the first prediction;
- determining, at the second layer, a second plurality of predictions associated with a second plurality of degrees of uncertainty based at least on the first plurality of degrees of uncertainty and the first plurality of predictions.

20. The system of claim 11, wherein the instructions are further configured to cause the processor to perform:
- recording, at the first node, the input uncertainty information.

* * * * *